US011685148B2

(12) United States Patent
Chen

(10) Patent No.: US 11,685,148 B2

(45) Date of Patent: Jun. 27, 2023

(54) FILM RELEASING ASSEMBLY, FILM STICKING MACHINE AND METHOD FOR USING THE FILM STICKING MACHINE

(71) Applicant: JIANGMEN IGUARDER ELECTRONIC CO., LTD., Guangdong (CN)

(72) Inventor: Haiying Chen, Jiangmen (CN)

(73) Assignee: JIANGMEN IGUARDER ELECTRONIC CO., LTD., Jiangmen (CN)

( * ) Notice: Subject to any disclaimer, the term of this patent is extended or adjusted under 35 U.S.C. 154(b) by 197 days.

(21) Appl. No.: 17/188,103

(22) Filed: Mar. 1, 2021

(65) Prior Publication Data

US 2021/0178739 A1 Jun. 17, 2021

Related U.S. Application Data

(63) Continuation-in-part of application No. PCT/CN2019/121786, filed on Nov. 29, 2019.

(30) Foreign Application Priority Data

Sep. 10, 2019 (CN) ......................... 201910853950.1

(51) Int. Cl.

*B32B 37/10* (2006.01)
*B32B 37/00* (2006.01)
(Continued)

(52) U.S. Cl.

CPC .......... *B32B 37/10* (2013.01); *B32B 37/0046* (2013.01); *B29C 63/02* (2013.01);
(Continued)

(58) Field of Classification Search

CPC ................ B29C 63/0047; B29C 63/02; B29C 2063/0008; B29C 2063/027;
(Continued)

(56) References Cited

U.S. PATENT DOCUMENTS

2007/0031997 A1 2/2007 Lee et al.
2016/0059531 A1 3/2016 Zhang et al.
2017/0001364 A1* 1/2017 MacDonald ........ B29C 65/7802

FOREIGN PATENT DOCUMENTS

CN 204979354 U 1/2016
CN 207496008 U 6/2018
CN 108748969 A 11/2018

OTHER PUBLICATIONS

Written Opinion from PCT/CN2019/121786 and English translation, dated Jun. 5, 2020 (6 pages).

(Continued)

*Primary Examiner* — Carson Gross

(74) *Attorney, Agent, or Firm* — Ware, Fressola, Maguire & Barber LLP

(57) ABSTRACT

Disclosed are a film releasing assembly, a film sticking machine and a method for using the film sticking machine. The film releasing assembly comprises a pedestal and a sliding block seat. The pedestal is recessed inwards to form a process groove therein, and the process groove defines a positioning area and a film sticking area which are communicated with each other. The sliding block seat is arranged in the process groove and capable of reciprocating in the positioning area and the film sticking area, and the sliding block seat at one end thereof facing to the film sticking area comprises a pushing portion formed to peel a release layer off from a film and guide the release layer peeled downwards to the process groove.

10 Claims, 14 Drawing Sheets

200 210 300 500 right left 1212 400 1211 120 111 110

(51) Int. Cl.
*B32B 38/18* (2006.01)
*B29L 31/34* (2006.01)
*B29C 65/00* (2006.01)
*B29C 63/02* (2006.01)

(52) U.S. Cl.
CPC ..... *B29C 66/345* (2013.01); *B29L 2031/3437* (2013.01); *B32B 38/1833* (2013.01)

(58) Field of Classification Search
CPC . B29C 66/342; B29C 66/345; B32B 37/0046; B32B 37/003; B32B 37/10; B32B 38/1833; B32B 38/1841; B29L 2031/3437
See application file for complete search history.

(56) References Cited

OTHER PUBLICATIONS

International Search Report from PCT/CN2019/121786 and English translation, dated Jun. 11, 2020 (5 pages).

* cited by examiner

20

FILM RELEASING ASSEMBLY, FILM STICKING MACHINE AND METHOD FOR USING THE FILM STICKING MACHINE

CROSS-REFERENCE TO RELATED APPLICATION

This application is filed as a bypass continuation-in-part application of PCT application PCT/CN2019/121786 filed Nov. 29, 2019, designating the United States, which claims priority to Chinese patent application No. 201910853950.1 filed Sep. 10, 2019, the entire contents of both of which are incorporated herein by reference.

TECHNICAL FIELD

The present disclosure relates to the field of film sticking devices for electronic devices, and more particularly, to a film releasing assembly, a film sticking machine and a method for using the same.

BACKGROUND

Electronic devices are widely used in modern society, and such an electronic device is usually provided with a screen having a touch function. A user, with his/her fingers, through the conductivity of the skin of fingers, can touch the screen, i.e. clicking on virtual keys to initial calls, or menus to get information. To prevent the surface of the screen from the damage caused by frequent touch or friction or collision, it is necessary to attach a protective film on the screen.

The protective film generally consists of a film sheet with an adhesive side, a release layer attached to the adhesive side of the film sheet, and a protective layer attached to another side of the film sheet. Some protective films may be additionally provided with a positioning mechanism for positioning on their release layers or protective layers. At present, most of the protective films are manually attached to the electronic devices, and such a method poses a high requirement on users, leading to low work efficiency and poor attaching effect, for example, many protective films are scrapped due to unaligned attachment, bubble generation, or impurity adhesion. Another method for attaching a protective film to an electronic device may involve a film sticking machine aiding in film attaching. However, the film sticking machine in related technologies usually has a complicated structure with a complex operation and low accuracy, and during an attaching operation of the machine, the release layer needs to be manually peeled off, so that dust may easily adhere to the film sheet or the screen of the electronic device during the operation, leading to scrapping of the protective film.

SUMMARY

The present disclosure aims to at least partially solve one of the technical problems in the existing art. For this purpose, the present disclosure provides a film releasing assembly with improved efficiency of peeling a release layer, improved quality for film sticking, and simple and easy operation.

A film releasing assembly according to a first aspect of the present disclosure includes a pedestal and a sliding block seat. The pedestal is recessed inwards to form a process groove therein, and the process groove defines a positioning area and a film sticking area which are communicated with each other. The sliding block seat is arranged in the process groove and capable of reciprocating in the positioning area and the film sticking area, and the sliding block seat at one end thereof facing to the film sticking area includes a pushing portion formed to peel a release layer off from a film and guide the release layer peeled downwards to the process groove.

The film releasing assembly according to embodiments of the present disclosure has at least the following beneficial effects: through the sliding block seat capable of reciprocating in the positioning area and the film sticking area in the process groove, the release layer of a protective film may be peeled off from the film sheet and aligned with the film sheet during the sliding block seat being moved from the positioning area to the film sticking area, the film releasing assembly has an simple and convenient operation, and allows a precise positioning of a screen of an electronic device to the film sheet; and the release layer is guided downwards below the process groove while peeled, so that impurities adhered to the film sheet or the screen of the electronic device in a process of peeling off the release layer are avoided, resulting in a better film sticking quality.

According to some embodiments of the present disclosure, the pedestal includes a positioning hook protruding from a bottom of the process groove and matched with a connection identifier in the film sticking area, and the sliding block seat on a lower part thereof includes a receding groove matched with the positioning hook.

According to some embodiments of the present disclosure, the pushing portion includes a film releasing portion protruding towards a moving direction of the sliding block seat. According to some embodiments of the present disclosure, the film releasing portion is arranged on one side of the pushing portion, and includes a pushing bevel inclined towards another side of the pushing portion away from the film releasing portion.

According to some embodiments of the present disclosure, the pedestal includes a guide rail arranged on a side wall of the process groove and connected between the positioning area and the film sticking area, and the sliding block seat includes a guide member matched with the guide rail; and the sliding block seat on a lower part thereof includes a plurality of first guide wheels arranged at intervals, and the pedestal includes a guide groove formed on a bottom of the process groove and matched with the first guide wheels.

According to some embodiments of the present disclosure, the sliding block seat on a lower part thereof includes second guide wheels, and the pedestal includes a limit boss formed on a bottom of the process groove in the film sticking area and matched with the second guide wheels.

A film sticking machine according to a second aspect of the present disclosure includes the film releasing assembly described above.

The film sticking machine according to the embodiments of the present disclosure has at least the following beneficial effects: by using the above film releasing assembly, a user may easily manipulate the film releasing assembly to efficiently and stably peel off the release layer, so that impurities adhered to the film sheet or the screen of the electronic device in a process of peeling off the release layer are avoided, resulting in better film sticking quality for the film sticking machine.

According to some embodiments of the present disclosure, the film sticking machine further includes a film sticking assembly, a film positioner, and a device positioner. The film sticking assembly includes a film presser arranged above the pedestal and in the film sticking area and a positioning seat arranged in the film sticking area in a sliding manner along a film sticking direction. The film positioner is configured to lock a protective film in location, and arranged above the positioning seat. The device positioner is configured to lock an electronic device in location, and arranged above the sliding block seat.

According to some embodiments of the present disclosure, the film presser includes a film pressing mechanism, a pushing handle and a supporting frame. The film pressing mechanism includes a separating sheet, and a film pressing strip protruding along a lower surface of the separating sheet. The pushing handle is vertically spaced from the film pressing mechanism to define a penetrating space between the pushing handle and the separating sheet. The supporting frame has an upper end and a lower end which are respectively connected with the film pressing mechanism and the pushing handle.

A method for using the film sticking machine according to a third aspect of the present disclosure includes steps of: moving the device positioner to the positioning area; providing and positioning a protective film in the film positioner; providing and positioning an electronic device in the device positioner; moving the device positioner from the positioning area to the film sticking area, to align the device positioner with the film positioner; pressing a separating part of the protective film, while moving the film presser along the film sticking direction, to attach a film sheet of the protective film to a screen of the electronic device; and moving the device positioner from the film sticking area to the positioning area.

The method for using the film sticking machine according to the embodiments of the present disclosure has at least the following beneficial effects: with the above film sticking machine, the film sticking operation is simple and easy, and the film sticking quality is high.

A film presser according to a fourth aspect of the present disclosure includes a film pressing mechanism, a pushing handle, and a supporting frame. The film pressing mechanism includes a separating sheet and a film pressing strip protruding along a lower surface of the separating sheet. The pushing handle, vertically spaced from the film pressing mechanism to define a penetrating space between the pushing handle and the separating sheet. The supporting frame has an upper end and a lower end which are respectively connected with the film pressing mechanism and the pushing handle.

A film sticking assembly according to a fifth aspect of the present disclosure includes the film presser described above, and a positioning seat defining a film sticking space. The film presser is arranged in the film sticking space in a sliding manner along a film sticking direction.

BRIEF DESCRIPTION OF THE DRAWINGS

The above and/or additional aspects and advantages of the present disclosure will be apparent and easily understood from the description of the embodiments with reference to the following accompanying drawings, in the drawings.

DETAILED DESCRIPTION

Figure 1:
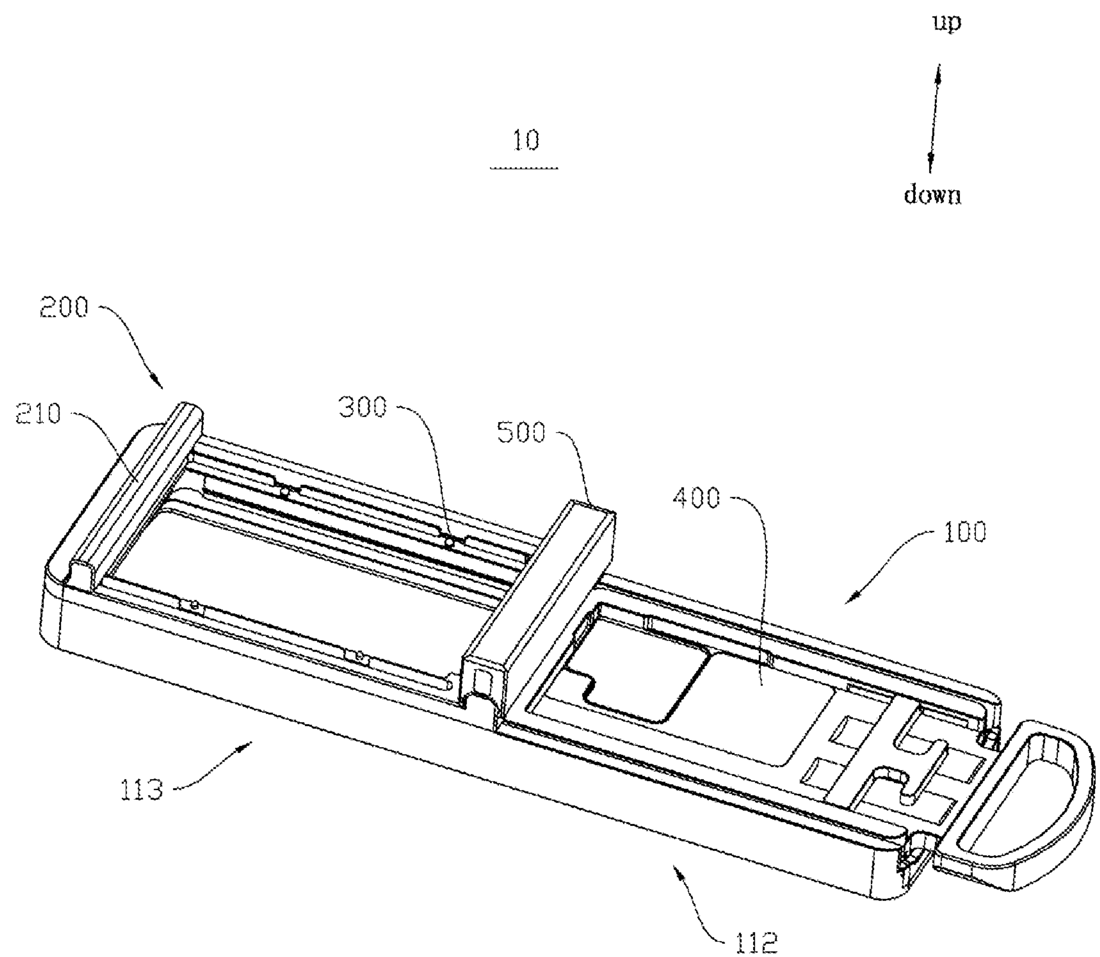
FIG. 1 is a structure diagram of a film sticking machine according to an embodiment of the present disclosure.

The embodiments of the present disclosure are described in detail hereinafter. Examples of the embodiments are shown in the accompanying drawings. The same or similar reference numerals throughout the accompanying drawings denote the same or similar elements or elements having the same or similar functions. The embodiments described hereinafter with reference to the accompanying drawings are exemplary and are only used to explain the present disclosure, but should not be understood as limiting the present disclosure.

In the description of the present disclosure, it should be understood that the orientation or position relationship indicated by the terms "up", "down", "front", "rear", "left", "right", and the like is based on the orientation or position relationship shown in the accompanying drawings, it is only for the convenience of description of the present disclosure and simplification of the description, and it is not to indicate or imply that the indicated device or element must have a specific orientation, and be constructed and operated in a specific orientation. Therefore, the terms shall not be understood as limiting the present disclosure.

In the description of the present disclosure, "a" refers to one or more. If the terms "first" and "second" are described, the descriptions are used for the purpose of distinguishing the technical features only, and cannot be understood as indicating or implying relative importance, implicitly indicating the number of technical features indicated thereby, or implicitly indicating the order of technical features indicated thereby.

In the description of the present disclosure, the terms "arrangement", "installation", "connection" and the like should be understood in broad sense unless otherwise specified and defined. The specific meaning of the above terms in the present disclosure may be reasonably determined according to specific contents of the technical solutions by those skilled in the art.

The following reference numbers are used with reference to the Figures:

10 refers to film sticking machine; 20 refers to protective film; 21 refers to film sheet; 22 refers to release layer; 23 refers to protective layer; 24 refers to connection identifier; 25 refers to separating part;

100 refers to film releasing assembly; 110 refers to pedestal; 120 refers to sliding block seat;

111 refers to process groove; 112 refers to positioning area; 113 refers to film sticking area; 114 refers to guide rail; 115 refers to guide groove; 116 refers to limit boss; 117 refers to positioning hook; 121 refers to pushing portion; 1211 refers to film releasing portion; 1212 refers to pushing bevel; 122 refers to guide member; 123 refers to first guide wheel; 124 refers to second guide wheel; 125 refers to receding groove;

200 refers to film sticking assembly; 210 refers to film presser; 211 refers to film pressing mechanism; 2111 refers to separating sheet; 2112 refers to film pressing strip; 2113 refers to guide portion; 2114 refers to guide plane; 2115 refers to clamping groove; 2116 refers to scrapper portion; 2117 refers to positioning sheet; 212 refers to pushing handle; 2121 refers to pushing portion; 213 refers to supporting frame; 2131 refers to boss; 2132 refers to bolt; 214 refers to guide mechanism; 2141 refers to roller; 220 refers to positioning seat; 221 refers to film sticking space; 222 refers to guide rail;

300 refers to film positioner;

400 refers to device positioner; and

500 refers to dedusting assembly.

Figure 2:
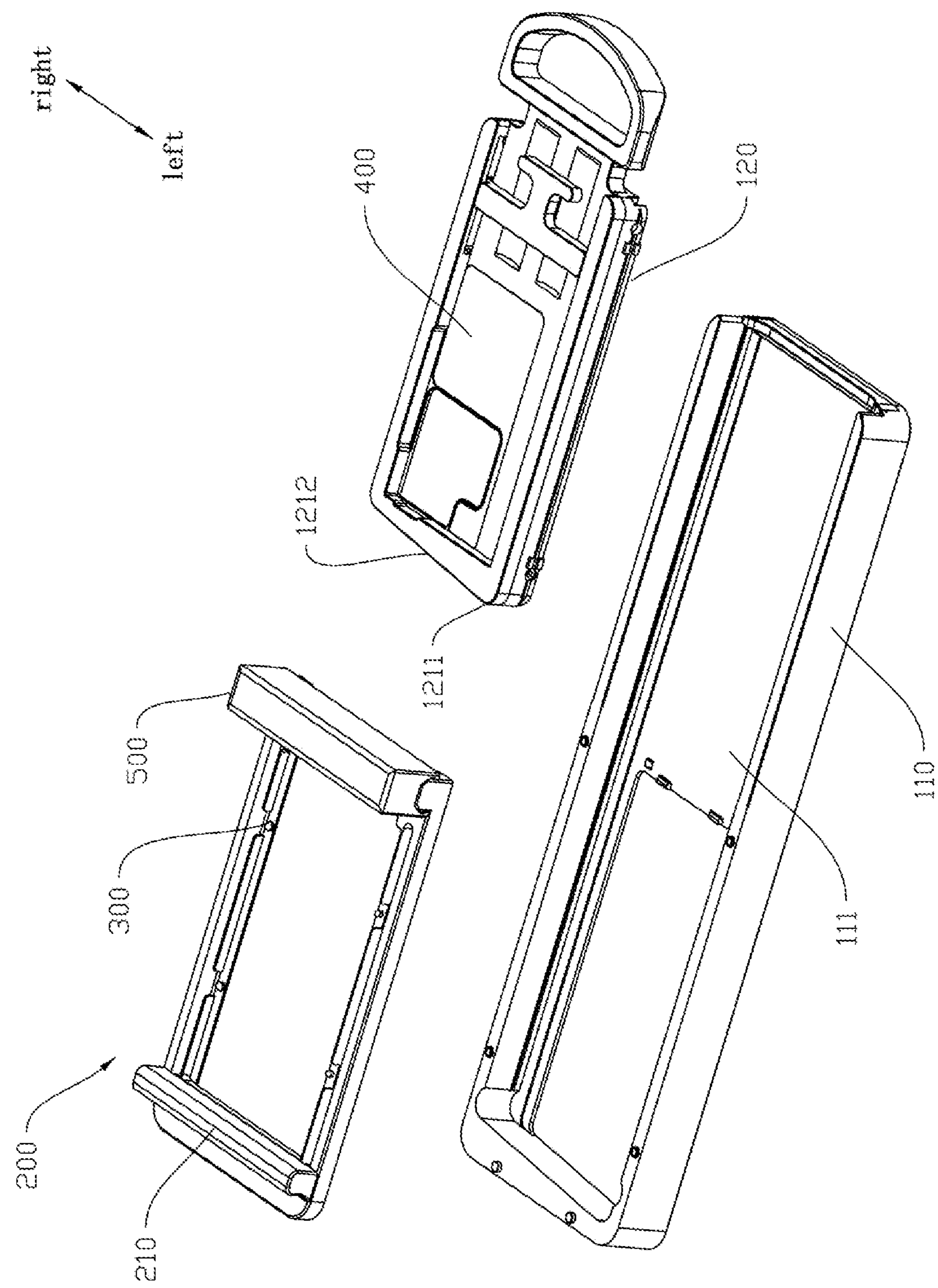
FIG. 2 is an exploded view of the film sticking machine shown in FIG. 1.
Figure 3:
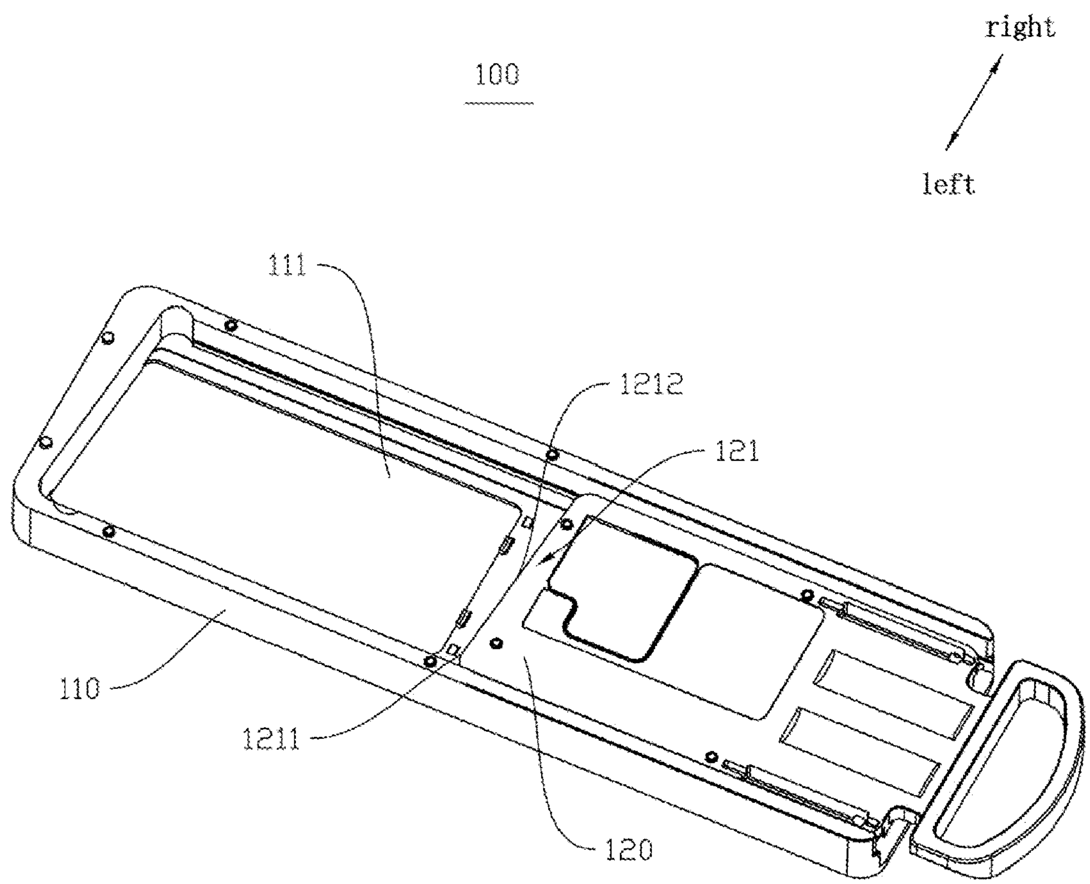
FIG. 3 is a structure diagram of a film releasing assembly according to an embodiment of the present disclosure.
Figure 13:
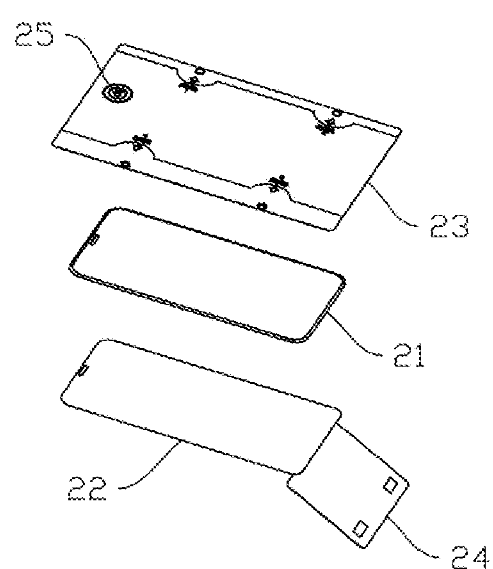
FIG. 13 is an exploded view of a protective film shown in FIG. 9.

With reference to FIGS. 1-2, a film sticking machine 10 according to an embodiment of the present disclosure includes a film releasing assembly 100, a film sticking assembly 200, a film positioner 300, and a device positioner 400. Specifically, as shown in FIG. 13, a protective film 20 is consisted of a film sheet 21, a release layer 22, and a protective layer 23, and the release layer 22 at one end is also provided with a connection identifier 24. The film positioner 300 is used for locking the protective film 20 in location, where the locking is achieved by means of a positioning hole in the protective layer 23. The device positioner 400 is used for locking an electronic device in position. The film releasing assembly 100 is constructed to bring the device positioner 400 to reciprocate between a positioning area 112 and a film sticking area 113 while peeling off the release layer 22. The film sticking assembly 200 is constructed to attach the film sheet 21 on the film positioner 300 to a screen of the electronic device, to achieve film sticking on the electronic device. The film sticking machine according to the invention has a simple structure, providing high accuracy and excellent quality for film sticking.

With reference to FIGS. 2-5, the film releasing assembly 100 according to an embodiment of the present disclosure includes a pedestal 110 and a sliding block seat 120, where the pedestal 110 is inwards recessed to form a process groove 111, and the process groove 111 defines the positioning area 112 and the film sticking area 113 which are communicated with each other. The sliding block seat 120 is arranged in the process groove 111 and may reciprocate in the positioning area 112 and the film sticking area 113. A pushing portion 121 is formed at one end of the sliding block seat 120 facing to the film sticking area 113, to peel the release layer 22 off from the film sheet 21 and guide the release layer 22 peeled downwards to the process groove 111. Specifically, when the sliding block seat 120 moves from the positioning area 112 to the film sticking area 113, the release layer 22 of the protective film 20 is gradually peeled off from the film sheet 21 by means of the pushing portion 121 and aligned with the film sheet 21, this operation is simple and convenient, and the electronic device is precisely positioned between the screen of the electronic device and the film sheet 21. In addition, the release layer 22 is guided downwards below the process groove 111 while peeled, so that impurities adhered to the film sheet 21 or the screen of the electronic device in a process of peeling off the release layer 22 are avoided, and the film sticking quality is improved.

Figure 4:
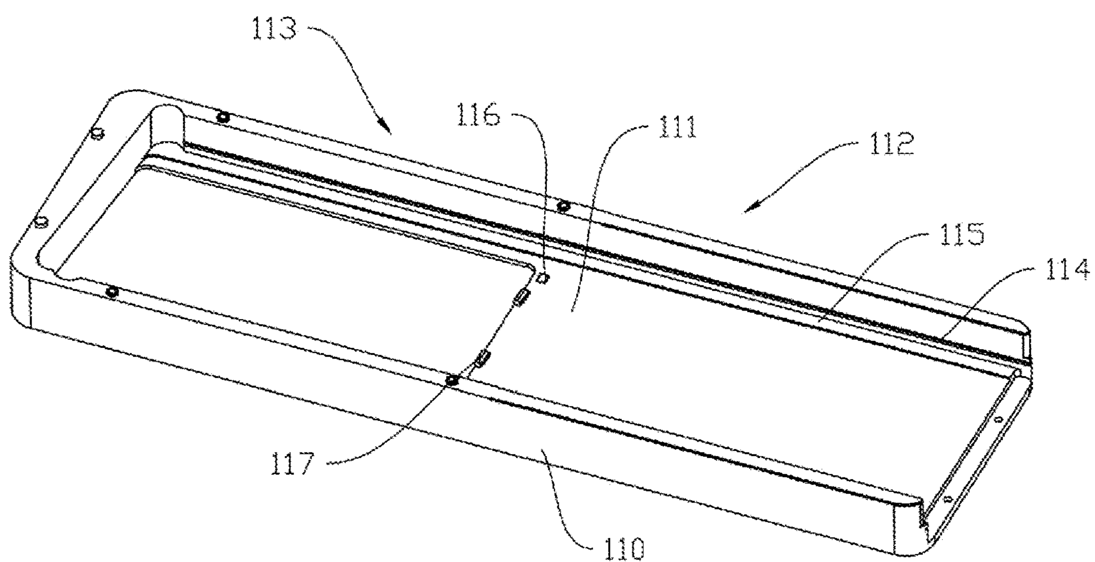
FIG. 4 is a structure diagram of a pedestal shown in FIG. 3.
Figure 5:
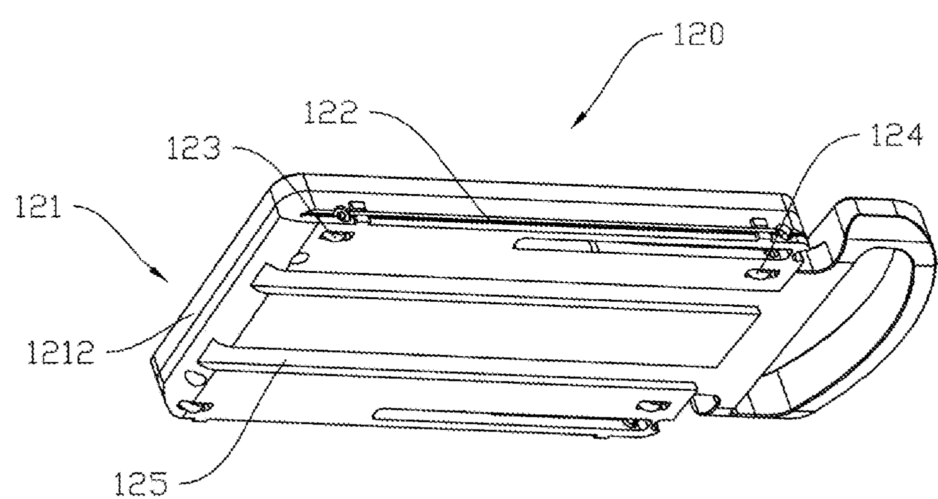
FIG. 5 is a structure diagram of a sliding block seat shown in FIG. 3.

With reference to FIGS. 4-5, the pushing portion 121 has a film releasing portion 1211 protruding towards a moving direction of the sliding block seat 120, and the film releasing portion 1211 is arranged along a lateral direction relative to the pushing portion 121, alternatively, the film releasing portion 1211 may be arranged at a left side, a right side or between the left and right sides, relative to the pushing portion 121. When the sliding block seat 120 is slid to the film sticking area 113, the film releasing portion 1211 comes in contact with the release layer 22 first. A small contact area between the film releasing portion 1211 and the release layer 22 allows a reduced pressure area on the release layer 22, so that, through the pushing portion 121, the release layer 22 can be peeled off more easily and smoothly, resulting in an improved peeling efficiency, a more stable peeling process and a better peeling effect for the release layer 22. Further, with reference to FIGS. 2-3, the film releasing portion 1211 is arranged on one side of the pushing portion 121, for example in the drawings it is on a left side. The film releasing portion 1211 is inclined along one side of the pushing portion 121 away from the film releasing portion 1211 in a transitional manner to define a pushing bevel 1212. In this embodiment, the release layer 22 is peeled from the left side, and the pushing bevel 1212 is capable of continuously and stably pushing the release layer 22 to be gradually peeled off from the film sheet 21 along an inclined line, so that the sliding block seat 120 can have further improved efficiency in peeling off the release layer 22 during a sliding process, and the release layer 22 can have a simpler design, without an additional structure designed to be matched with the film releasing portion 1211.

With reference to FIGS. 4-5, the process groove 111 has a bottom protruding to form a positioning hook 117 matched with a connection identifier 24 in the film sticking area 113. When the sliding block seat 120 is being moved from the positioning area 112 to the film sticking area 113, the pushing portion 121 pushes the connection identifier 24 to the positioning hook 117. The release layer 22 is stably guided to below the process groove 111 under the positioning cooperation between the positioning hook 117 and the connection identifier 24, so that the release layer 22 can be better separated from the film sheet 21, and an improved peeling effect for the release layer 22 is provided. It is appreciated that, a receding groove 125 matched with the positioning hook 117 is formed in a lower portion of the sliding block seat 120, providing better running stability and improved guide accuracy for the sliding block seat 120.

With reference to FIGS. 4-5, in some embodiments of the present disclosure, on both lateral side walls of the process groove 111, guide rails 114 connected between the positioning area 112 and the film sticking area 113 are provided. The guide rails 114 are symmetrically arranged along two lateral side walls of the process groove 111, and the sliding block seat 120 is provided with guide members 122 matched with the guide rail 114, so that the sliding block seat 120 can move more smoothly, and is guided more accurately. Further, in a lower portion of the sliding block seat 120, a plurality of first guide wheels 123 are provided at intervals, and on a bottom of the process groove 111, a guide groove 115 matched with the first guide wheels 123 is provided. The first guide wheels 123 are rollably supported on the guide groove 115, so that the degree of freedom of the sliding block seat 120 along the left-right direction is further limited, shaking of the sliding block seat 120 in a moving process is further reduced, a guide accuracy of the sliding block seat 120 is improved, and a service life of the film releasing assembly 100 is prolonged.

With reference to FIGS. 4-5 again, further, on the lower portion of the sliding block seat 120, a plurality of second guide wheels 124 are provided, and on the bottom of the process groove 111, a limit boss 116 matched with the second guide wheels 124 is provided in the film sticking area 113. The limit boss 116 is located on a traveling route of the second guide wheels 124, and the second guide wheels 124 are rollably supported on the process groove 111. When the sliding block seat 120 moves from the positioning area 112 to a designated location in the film sticking area 113, the second guide wheels 124 roll over the limit boss 116 and then abut against the limit boss 116, so that the sliding block seat 120 can be accurately positioned in the designated position of the film sticking area 113. Moreover, a user can intuitively judge an aligning location of the film sheet 21, and the operation is simpler.

With reference back to FIGS. 1-2, the film sticking machine 10 according to the embodiment of the present disclosure includes the film releasing assembly 100 of the above embodiment, the user may conveniently operate the film releasing assembly 100 to efficiently and stably peel off the release layer 22, so that impurities are avoided from adhering to the film sheet 21 or the screen of the electronic device in a process of peeling off the release layer 22, whereby the film sticking quality of the film sticking machine 10 is improved.

Figure 6:
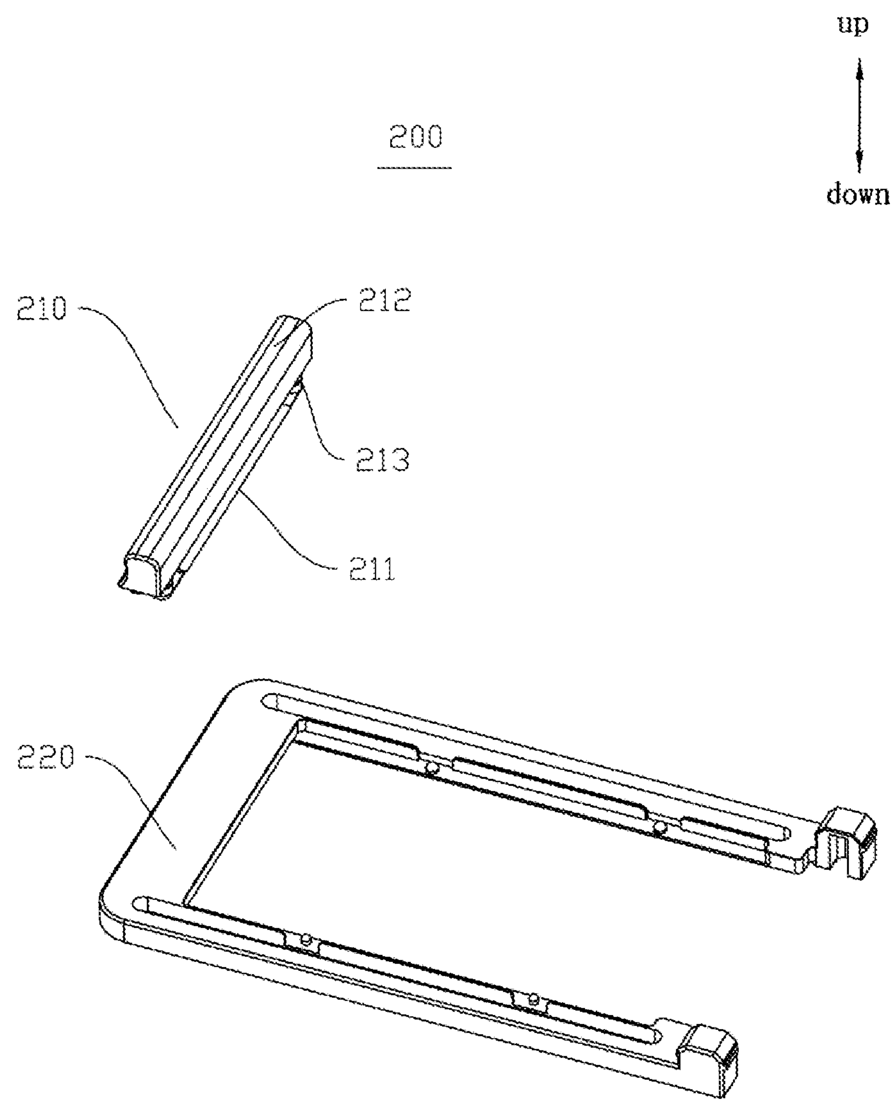
FIG. 6 is an exploded view of a film sticking assembly shown in FIG. 1.

In some embodiments of the present disclosure, with reference to FIGS. 6 and 1-2, the film sticking machine 10 further includes a film sticking assembly 200, a film positioner 300, and a device positioner 400. The film sticking assembly 200 includes a film presser 210 and a positioning seat 220, the positioning seat 220 is arranged above the pedestal 110 and located in the film sticking area 113, and the film presser 210 is arranged in the film sticking area 113 in a sliding manner along a film sticking direction. The film positioner 300 is arranged above the positioning seat 220. The device positioner 400 is arranged above the sliding block seat 120. When the user manipulates the film releasing assembly 100, pushing the device positioner 400 to move from the positioning area 112 to the film sticking area 113, the pushing portion 121 peels off the release layer 22 of the protective film 20 and aligns the device positioner 400 with the film positioner 300. The user then manipulates the film sticking assembly 200, to separate the protective layer 23 of the protective film 20 in the film positioner 300 from the film sheet 21, and attach the film sheet 21 in the film positioner 300 to the screen of the electronic device, whereby a film sticking process of the electronic device is completed. The film sticking machine 10 of the present disclosure can offer simpler manipulation, higher film sticking accuracy, and better film sticking quality.

With reference back to FIGS. 1-2, the film sticking machine 10 according to the embodiment further comprises a dedusting assembly 500 for removing dust on a surface of the electronic device. The dedusting assembly 500 is arranged on the pedestal 110 and located at a junction of the positioning area 112 and the film sticking area 113, so that the screen of the electronic device can be dedusted when the device positioner 400 is moved from the positioning area 112 to the film sticking area 113, impurities are prevented from adhering to the screen of the electronic device, and the film sticking quality is further improved.

Figure 7:
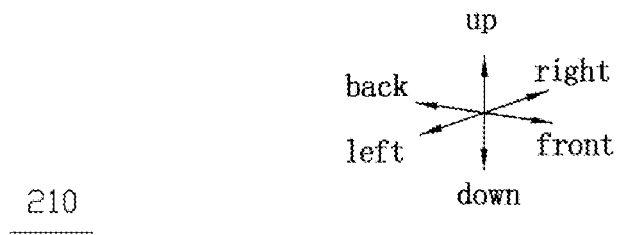
FIG. 7 is a structure diagram of a film presser according to an embodiment of the present disclosure.
Figure 7:
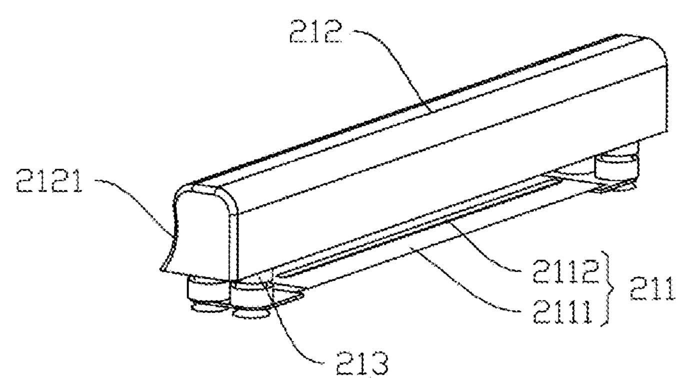

With reference to FIGS. 6-7, the film presser 210 includes a film pressing mechanism 211, a pushing handle 212, and a supporting frame 213. The supporting frame 213 has an upper end and a lower end respectively connected with the film pressing mechanism 211 and the pushing handle 212, i.e. connecting the pushing handle 212 and the film pressing mechanism 211, whereby a movement of the film pressing mechanism 211 is controlled by means of the pushing handle 212. Specifically, the film pressing mechanism 211 includes a separating sheet 2111 and a film pressing strip 2112, and the separating sheet 2111 may separate the protective layer 23 from the film sheet 21, thereby reducing interference of the protective layer 23 on film sticking and eliminating steps of manually removing the protective layer 23 by the user. In addition, the film pressing strip 2112 protrudes along a lower surface of the separating sheet 2111, to press the film sheet 21 for bubble elimination, whereby the bubbles can be continuously and effectively discharged while the film sheet 21 is coming in contact with the screen of the electronic device, offering better sticking quality. It should be further noted that, the film pressing strip 2112 is generally made of an elastic buffer material, such as rubber, and the like. The film pressing strip 2112 has a certain deformation, and consequently a certain buffering force under pressure, so that the film pressing strip 2112 can exert a pressure on the film sheet 21 for effective air discharge while protecting the film sheet 21. Further, the pushing handle 212 and the film pressing mechanism 211 are spaced vertically to define a penetrating space in between the pushing handle 212 and the separating sheet 2111. The separating sheet 2111 separates the protective layer 23 from the film sheet 21 and guides the protective layer 23 to pass through the penetrating space, without influence exerted by the protective layer 23 on the film sticking process, and whereby the film sticking quality is further improved.

Figure 8:
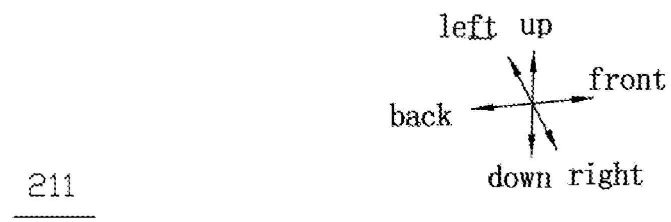
FIG. 8 is an exploded view of a film pressing mechanism shown in FIG. 7.
Figure 8:
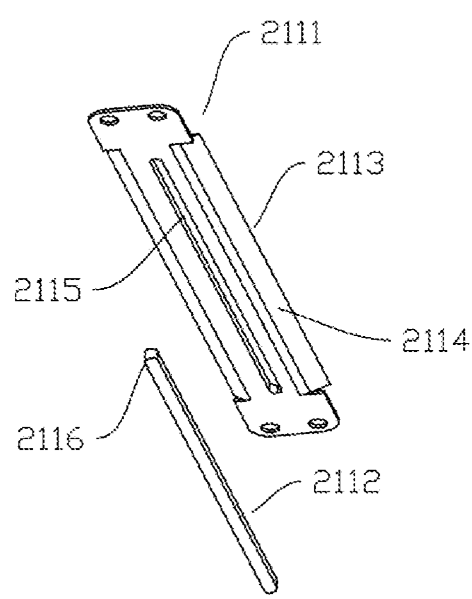

With reference to FIG. 8, a guide portion 2113 is formed at a forward end of the separating sheet 2111, and a guide plane 2114 is formed on a lower surface of the guide portion 2113, the guide plane 2114 is inclined backward from top to bottom. The inclined arrangement of the guide plane 2114 is beneficial for quickly separating the protective layer 23 from the film sheet 21, and preventing the guide portion 2113 from being in contact with the film sheet 21 to cause damage to the film sheet 21.

With reference to FIG. 8, the separating sheet 2111 is provided with a clamping groove 2115 along a left-right direction, and the film pressing strip 2112 is mounted in the clamping groove 2115, and provided with a scraper portion 2116 protruding towards the bottom of the clamping groove 2115. The scraper portion 2116 has an inverted conical structure with a large top and a small bottom, the scraper portion 2116 is capable of being effectively deformed to fit the film sheet 21 during a sliding process of the separating sheet 2111, thereby offering better bubble discharge effect. Further, the clamping groove 2115 is in a gradually shrinking shape from top to bottom, and the film pressing strip 2112 and the clamping groove 2115 are mounted in a transitional fit or interference fit, so that an mounting structure between the film pressing strip and the clamping groove is more stable and durable. Glue may also be applied to a contact surface between the film pressing strip 2112 and the clamping groove 2115, for higher stability of connection between the two.

With reference to FIGS. 6-7, a rear surface of the pushing handle 212 is concavely provided with a pushing portion 2121, offering convenience for the user to slide the pushing handle 212.

Figure 9:
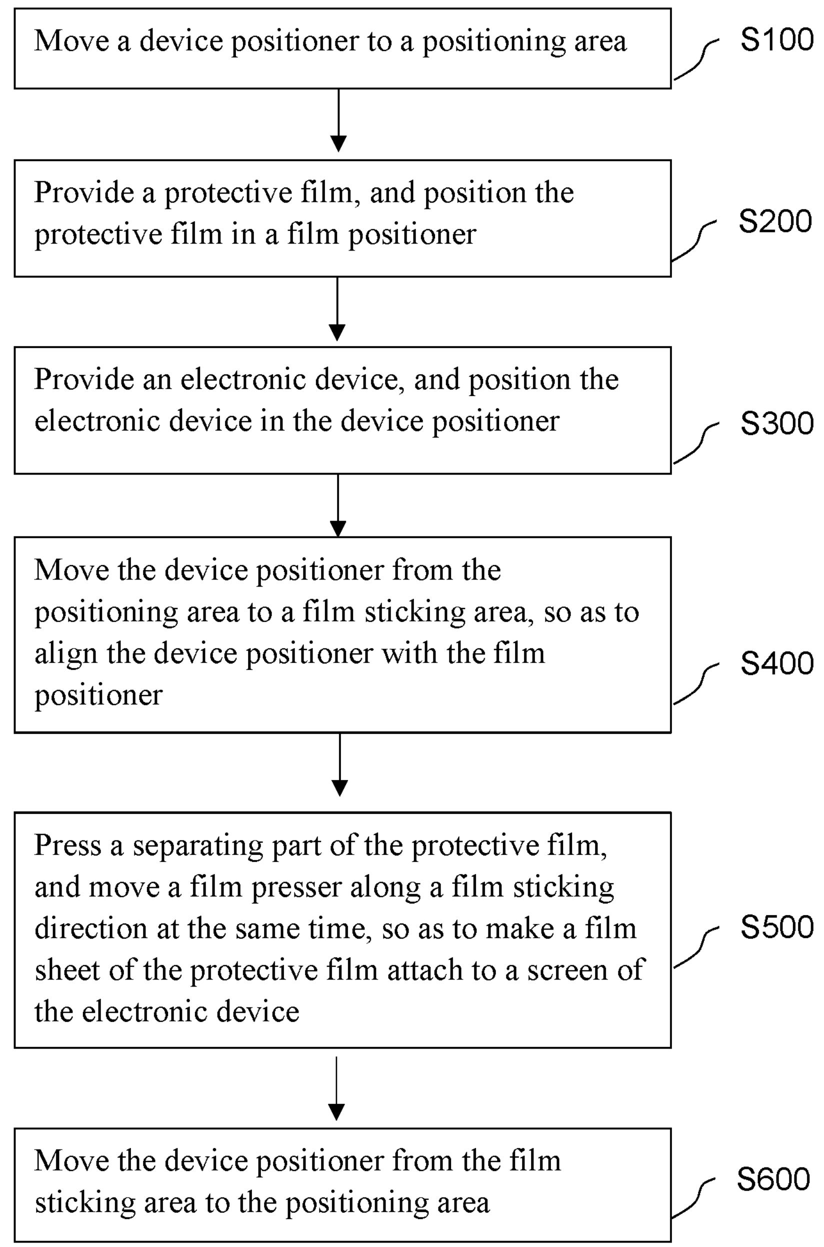
FIG. 9 is a flow chart of a method for using a film sticking machine according to an embodiment of the present disclosure.

With reference to FIGS. 9 and 13, according to an embodiment of the present disclosure a method for using the film sticking machine 10 includes the film sticking machine according to the above embodiment, and the method for using the film sticking machine 10 includes the following steps.

At S100, the device positioner 400 is moved to the positioning area 112.

At S200, a protective film 20 is provided, and the protective film 20 is positioned in the film positioner 300.

At S300, an electronic device 30 is provided, and the electronic device 30 is positioned in the device positioner 400.

Figure 10:
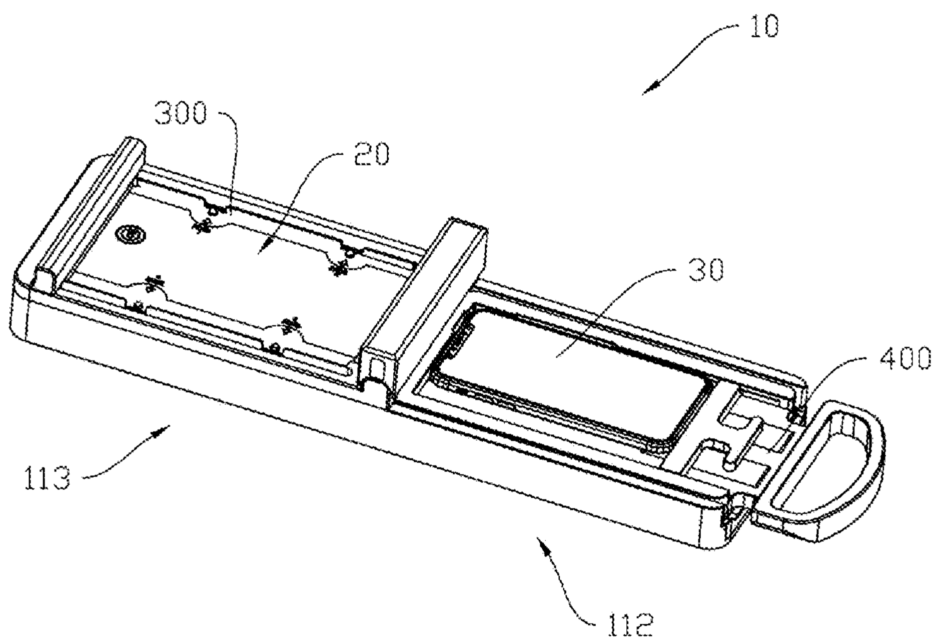
FIG. 10 is a schematic diagram of the film sticking machine subjected to step S300 shown in FIG. 9.

It should be noted that the execution order of the above step S200 and step S300 may be interchanged, and after the above steps are executed, a state shown in FIG. 10 is reached. At that moment, a film sticking preparation work of the film sticking machine 10 is completed.

At S400, the device positioner 400 is moved from the positioning area 112 to the film sticking area 113, to align the device positioner 400 with the film positioner 300.

Figure 11:
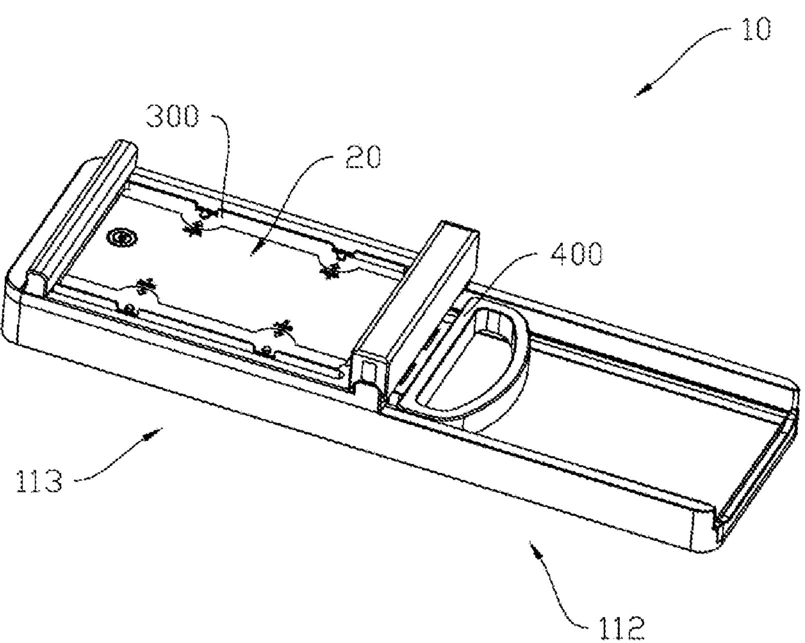
FIG. 11 is a schematic diagram of the film sticking machine subjected to step S400 shown in FIG. 9.

It should be noted that, the release layer 22 is gradually peeled off while the device positioner 400 is being moved from the positioning area 112 to the film sticking area 113. After the above step is executed, a state shown in FIG. 11 is reached. At that moment, the film sheet 21 is completely aligned with the screen of the electronic device 30.

At S500, a separating part 25 of the protective film 20 is pressed, and the film presser 210 is moved along the film sticking direction at the same time, to attach a film sheet 21 of the protective film 20 to the screen of the electronic device 30.

Figure 12:
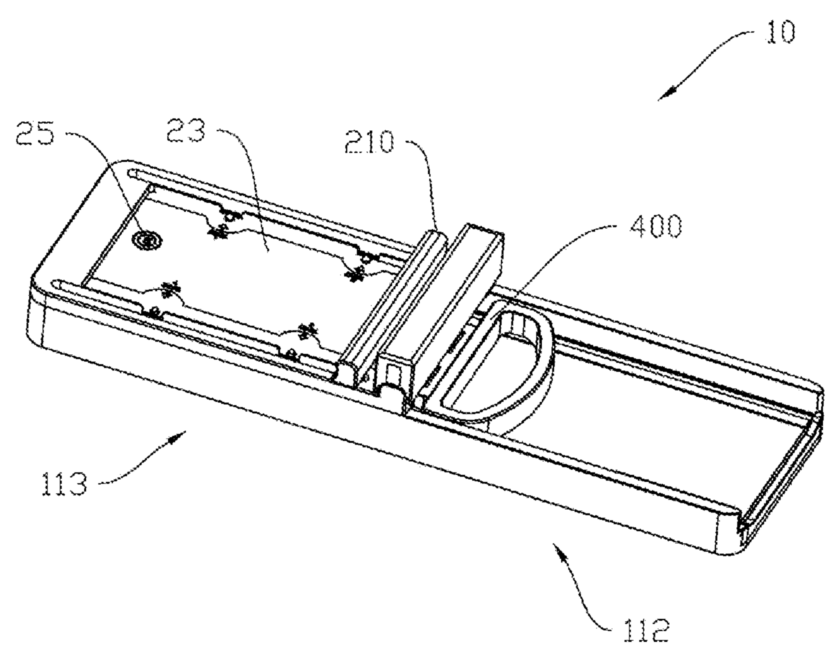
FIG. 12 is a schematic diagram of the film sticking machine subjected to step S500 shown in FIG. 9.

It should be noted that, the separating part is constructed to be pressed, facilitating the initial separation between the protective layer 23 and the film sheet 21. When the film presser 210 moves, the protective layer 23 can be gradually separated from the film sheet 21. After the above step is executed, a state shown in FIG. 12 is reached. At the moment, the film sheet 21 is already attached to the screen of the electronic device 30.

At S600, the device positioner 400 is moved from the film sticking area 113 to the positioning area 112. At the moment, the film sticking is completed, and a next film sticking operation may be performed once the protective layer 23 and the release layer 22 which are separated from the film sheet 21 in the film sticking area 113 are cleared. The film sticking machine 10 according to the embodiment has a simple structure and a convenient operation, and offers higher film sticking quality.

Figure 14:
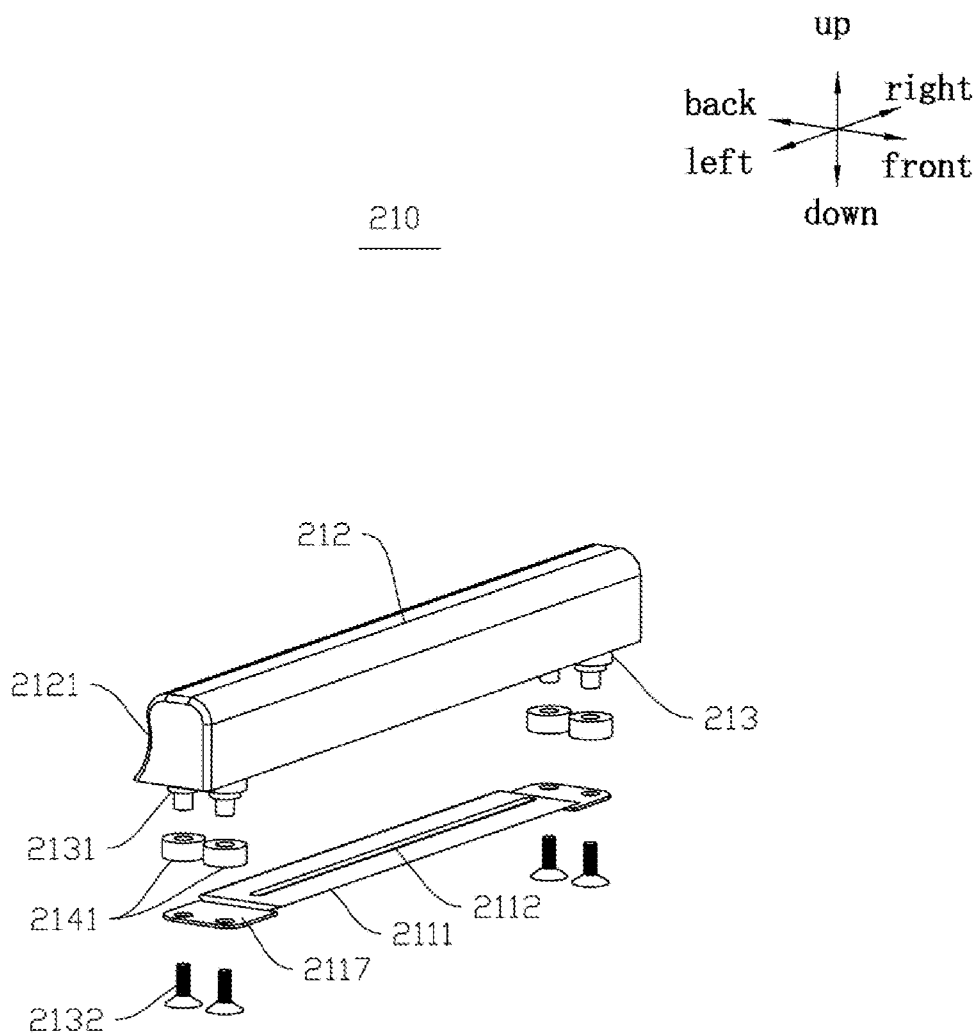
FIG. 14 is an exploded view of the film presser shown in FIG. 7.

With reference to FIGS. 7 and 14, the film presser 210 according to an embodiment of the invention includes a film pressing mechanism 211, a pushing handle 212, and a supporting frame 213. The supporting frame 213 has an upper end and a lower end respectively connected with the film pressing mechanism 211 and the pushing handle 212, i.e. the pushing handle 212 connects the film pressing mechanism 211, the movement of the film pressing mechanism 211 is controlled by means of the pushing handle 212. Specifically, the film pressing mechanism 211 includes a separating sheet 2111 and a film pressing strip 2112, and the separating sheet 2111 can separate the protective layer from the film sheet, thereby reducing interference of the protective layer on a film sticking process of the film presser 210, and reducing steps of manually removing the protective layer by the user. In addition, the film pressing strip 2112 is convexly formed along a lower surface of the separating sheet 2111, and the film pressing strip 2112 presses the film sheet. In the film sticking process, the film pressing strip 2112 is pressed down on the film sheet while the separating sheet 2111 separates the protective layer, so that the film sheet can gradually approach to the screen of the electronic device along the film sticking direction under pressure. Moreover, since the protective layer and the film sheet at rear in the film sticking direction are not separated at the moment, and the film sheet at rear in the film sticking direction does not come into contact with the screen of the electronic device, a contact angle is formed between the film sheet and the screen of the electronic device. The contact angle is gradually reduced during the movement of the film presser 210 along the film sticking direction, so that the film sheet may be gradually attached to the screen of the electronic device, and bubbles are continuously and effectively discharged during a gradual contact process, thereby improving the film sticking quality. It should be further noted that, the film pressing strip 2112 is generally made of an elastic buffer material, such as rubber, and the like. The film pressing strip 2112 has a certain deformation and consequently a certain buffering force under pressure, and thus the film sheet is protected, the stability of applying a pressure to the film sheet is ensured, and air can be effectively discharged from the film sheet. Further, the pushing handle 212 and the film pressing mechanism 211 are spaced vertically to define a penetrating space between the pushing handle 212 and the separating sheet 2111. The separating sheet 2111 is designed to separate the protective layer from the film sheet and guides the protective layer to pass through the penetrating space, without influence of the protective layer on a film sticking process, offering better film sticking quality.

The film presser 210 according to the embodiment has a simple structure and easy manipulation, the user only needs to manipulate the pushing handle 212 to slide, enabling the film pressing mechanism 211 to act on the protective film to complete the film sticking process. Moreover, the bubbles can be continuously and effectively discharged during the contact between the film sheet and the screen of the electronic device, offering higher film sticking quality.

Figure 15:
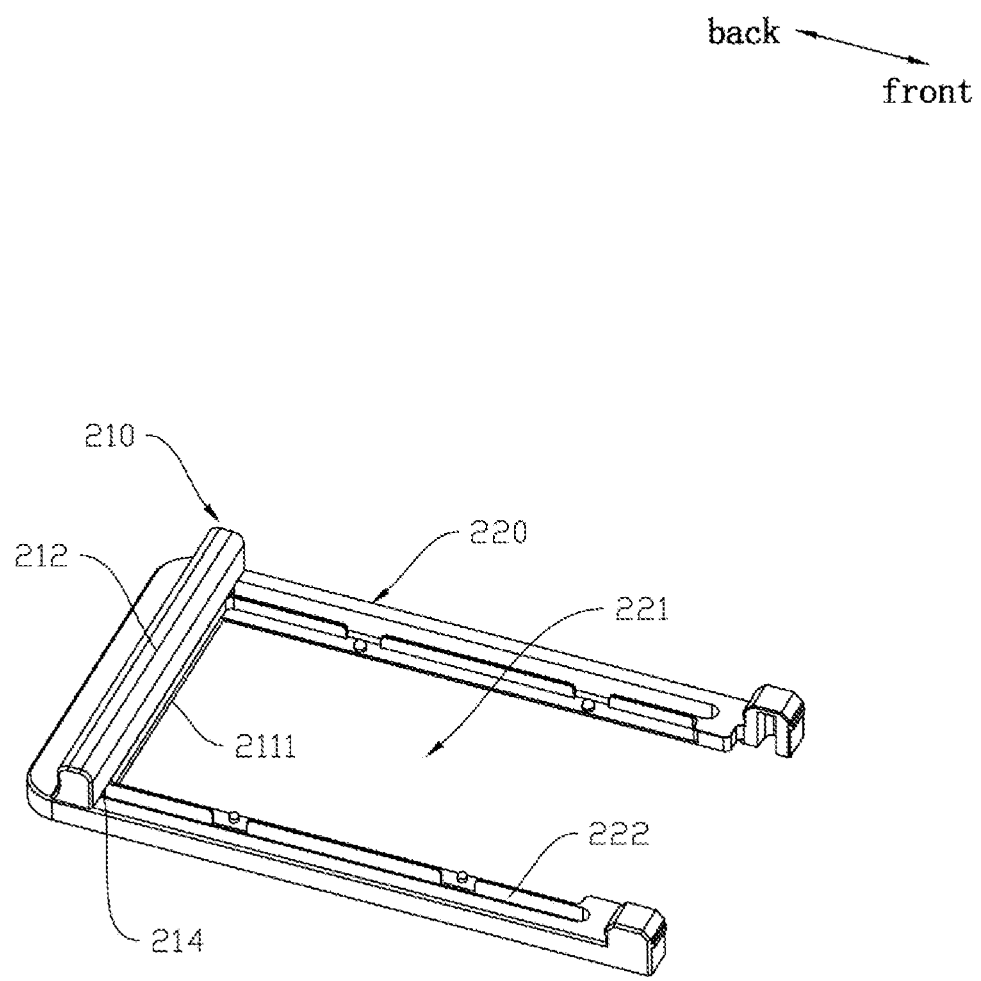
FIG. 15 is a structure diagram of a film sticking assembly according to an embodiment of the present disclosure.
Figure 16:
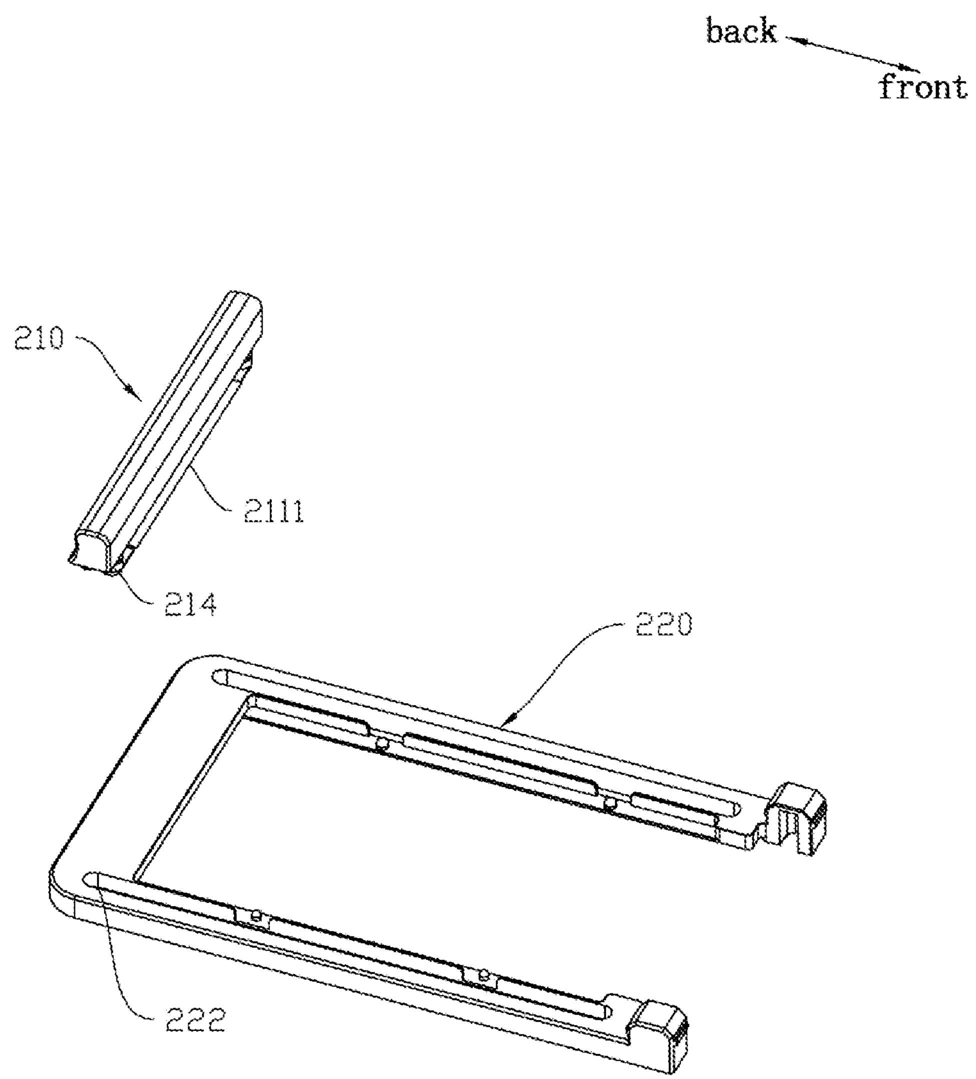
FIG. 16 is an exploded view of the film sticking assembly shown in FIG. 15.

With reference to FIGS. 15-16, the film sticking assembly according to the embodiment of the invention includes the film presser 210 according to the above embodiment, and further includes a positioning seat 220. The protective film is positioned on the positioning seat 220, and the positioning seat 220 defines a film sticking space 221. The film presser 210 is slidably arranged in the film sticking space 221 along the film sticking direction, and the film sticking direction is a forward direction of the film presser 210. Specifically, when the film presser 210 slides along the film sticking direction, the pushing handle 212 pushes the separating sheet 2111 to remove the protective layer, and the film pressing strip 2112 can accurately and stably attach the protective film to the screen of the electronic device located below the positioning seat 220, so that the film sticking quality is improved.

With reference to FIGS. 15-16 again, the film presser 210 further includes a guide mechanism 214, a guide rail 222 matched with the guide mechanism 214 is arranged on the positioning seat 220, and the guide rail 222 is arranged along the film sticking direction, for ensuring the sliding accuracy of the film presser 210, and improving the film sticking stability.

With reference to FIGS. 14-15, specifically, the guide mechanism 214 includes a plurality of sets of rollers 2141, both ends of the separating sheet 2111 are respectively connected with the supporting frames 213, and the plurality of sets of rollers 2141 are symmetrically arranged on the supporting frames 213 respectively, whereby the guide mechanism 214 has a stable structure, the film presser 210 confronts a smaller sliding resistance, and its service life is longer. It should be noted that, in the embodiment, two sets of rollers 2141 are arranged on each of the supporting frame 213 at intervals along the film sticking direction, thus effectively reducing swing of the separating sheet 2111 during sliding, and having a simpler structure, a lighter weight, and a lower cost. Further, each of the supporting frames 213 is provided with a boss 2131 matched with an upper end plane of each of the rollers 2141, the separating sheet 2111 at both ends is respectively provided with a positioning sheet 2117, and the positioning sheet 2117 is matched with a lower end plane of the roller 2141. The positioning sheet 2117 is connected with the supporting frame 213 through a bolt 2132, thereby offering a stable structure and convenience in assembling.

The embodiments of the present disclosure are described in detail with reference to the accompanying drawings above, but the present disclosure is not limited to the above embodiments, and various changes may also be made within the knowledge scope of those of ordinary skills in the art without departing from the purpose of the present disclosure.

What is claimed:

1. A film releasing assembly, comprising:

a pedestal, inwards recessed to form a process groove therein, and the process groove defining a positioning area and a film sticking area which are communicated with each other; and a sliding block seat, arranged in the process groove and capable of reciprocating in the positioning area and the film sticking area, and the sliding block seat at one end thereof facing to the film sticking area comprising a pushing portion formed to peel a release layer off from a film and guide the release layer peeled downwards to the process groove.

2. The film releasing assembly of claim 1, wherein, the pedestal comprises a positioning hook protruding from a bottom of the process groove and matched with a connection identifier in the film sticking area, and the sliding block seat on a lower part thereof comprises a receding groove matched with the positioning hook.

3. The film releasing assembly of claim 1, wherein the pushing portion comprises a film releasing portion protruding towards a moving direction of the sliding block seat.

4. The film releasing assembly of claim 3, wherein the film releasing portion is arranged on one side of the pushing portion, and comprises a pushing bevel inclined towards another side of the pushing portion away from the film releasing portion.

5. The film releasing assembly of claim 1, wherein the pedestal comprises a guide rail arranged on a side wall of the process groove and connected between the positioning area and the film sticking area, and the sliding block seat comprises a guide member matched with the guide rail; and the sliding block seat on a lower part thereof comprises a plurality of first guide wheels arranged at intervals, and the pedestal comprises a guide groove formed on a bottom of the process groove and matched with the first guide wheels.

6. The film releasing assembly of claim 1, wherein the sliding block seat on a lower part thereof comprises second guide wheels, and the pedestal comprises a limit boss formed on a bottom of the process groove in the film sticking area and matched with the second guide wheels.

7. A film sticking machine, comprising the film releasing assembly of claim 1.

8. The film sticking machine of claim 7, further comprising:

a film sticking assembly, comprising a film presser arranged above the pedestal and in the film sticking area and a positioning seat arranged in the film sticking area in a sliding manner along a film sticking direction;

a film positioner, configured to lock a protective film in location, and arranged above the positioning seat; and a device positioner, configured to lock an electronic device in location, and arranged above the sliding block seat.

9. The film sticking machine of claim 8, wherein the film presser comprises:

a film pressing mechanism, comprising a separating sheet, and a film pressing strip protruding along a lower surface of the separating sheet;

a pushing handle, vertically spaced from the film pressing mechanism to define a penetrating space between the pushing handle and the separating sheet; and a supporting frame, an upper end and a lower end of which are respectively connected with the film pressing mechanism and the pushing handle.

10. A method for using the film sticking machine of claim 9, comprising steps of:

moving the device positioner to the positioning area;

providing and positioning a protective film in the film positioner;

providing and positioning an electronic device in the device positioner;

moving the device positioner from the positioning area to the film sticking area, to align the device positioner with the film positioner;

pressing a separating part of the protective film, while moving the film presser along the film sticking direction, to attach a film sheet of the protective film to a screen of the electronic device; and moving the device positioner from the film sticking area to the positioning area.

* * * * *